(12) United States Patent
Kim et al.

(10) Patent No.: US 9,332,111 B2
(45) Date of Patent: May 3, 2016

(54) DATA TRANSFERRING METHOD USING DIRECTION INFORMATION AND MOBILE DEVICE USING THE SAME

(75) Inventors: Woosung Kim, Seoul (KR); Sangyun Lee, Seoul (KR); Haejin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 248 days.

(21) Appl. No.: 13/439,412

(22) Filed: Apr. 4, 2012

(65) Prior Publication Data

US 2013/0097525 A1  Apr. 18, 2013

(30) Foreign Application Priority Data

Oct. 13, 2011  (KR) .................. 10-2011-0104815

(51) Int. Cl.
    *G06F 3/048*  (2013.01)
    *H04M 1/725*  (2006.01)
    *G06F 3/0486*  (2013.01)
    *G06F 3/0488*  (2013.01)

(52) U.S. Cl.
    CPC ........... *H04M 1/7253* (2013.01); *G06F 3/0486* (2013.01); *G06F 3/04883* (2013.01); *H04M 2250/64* (2013.01)

(58) Field of Classification Search
    CPC .. G06F 3/0613; G06F 11/0709; G06F 19/321
    See application file for complete search history.

(56) References Cited

U.S. PATENT DOCUMENTS

| | | | |
|---|---|---|---|
| 2001/0020917 A1* | 9/2001 | Hamada et al. | ............... 342/442 |
| 2002/0176419 A1* | 11/2002 | Hummel | ............. H04L 12/1854 370/390 |
| 2005/0141534 A1* | 6/2005 | Kawabata | ............... H04L 12/56 370/411 |
| 2006/0132353 A1* | 6/2006 | Natsume et al. | ............... 342/147 |
| 2007/0146347 A1* | 6/2007 | Rosenberg | .......... G06F 3/04883 345/173 |
| 2007/0264976 A1* | 11/2007 | Lessing et al. | ............. 455/414.1 |
| 2009/0112453 A1* | 4/2009 | Mo | .................. G08G 1/096811 701/119 |
| 2009/0196171 A1* | 8/2009 | Ogasahara | .............. H04L 12/42 370/223 |
| 2009/0244015 A1* | 10/2009 | Sengupta | ............ G06F 3/04883 345/173 |
| 2010/0274900 A1* | 10/2010 | Javaid | .................. H04B 7/2606 709/226 |
| 2011/0252317 A1* | 10/2011 | Keranen | ............. G06F 3/04883 715/702 |
| 2011/0319016 A1* | 12/2011 | Gormley | ............. H04B 5/0012 455/41.1 |
| 2012/0275291 A1* | 11/2012 | Ikeda | .................... H04L 5/0007 370/210 |

FOREIGN PATENT DOCUMENTS

WO    WO 2011/041427 A2   4/2011

* cited by examiner

*Primary Examiner* — William Bashore
*Assistant Examiner* — Rayeez Chowdhury
(74) *Attorney, Agent, or Firm* — Birch, Stewart, Kolasch & Birch, LLP

(57) ABSTRACT

A method of transferring data between a first mobile terminal and a second terminal, the method includes displaying an object on a display unit of the first mobile terminal; receiving an input of a directional gesture on the displayed object; and transmitting the object to the second mobile terminal based on the input gesture, when the first mobile terminal and the second terminal are in a predetermined directional range with respect to each other.

18 Claims, 11 Drawing Sheets

DATA TRANSFERRING METHOD USING DIRECTION INFORMATION AND MOBILE DEVICE USING THE SAME

CROSS-REFERENCE TO A RELATED APPLICATION

This application claims the benefit of Korean Patent Application No. 10-2011-0104815, filed on Oct. 13, 2011, which is hereby incorporated by reference for all purposes as if fully set forth herein.

BACKGROUND OF THE INVENTION

1. Field of the Invention

The present invention relates to a data transferring method using direction information of a mobile terminal, and a mobile device using the same.

2. Background of the Invention

A mobile device may be configured to perform various functions such as data and voice communications, capturing still or moving images through a camera, storing sounds, playing music files through a speaker system, displaying images or videos, etc. Some of the mobile device may include an additional function to play games, and others may be implemented as multimedia devices. Recently, the mobile device is configured to watch videos or television programs by receiving broadcasting or multicast signals.

Various attempts have been made to implement complicated functions in the mobile device by means of hardware or software.

Digital contents received by the mobile device may be transferred to another mobile device, or digital contents received from another mobile device may be transferred to the mobile device. The digital contents include audio files, photos, moving images, etc.

Sharing of digital contents between mobile devices may be performed through an indirect communication method using a server, etc., or through a direct communication method using a short-range communication, etc.

However, a user has to perform complicated procedures for the file sharing. That is, there have been disclosed few methods for sharing data between mobile devices in easy and intuitive manners.

A touch function of the mobile device is implemented so as to allow a user not accustomed to input buttons or keys to easily operate the mobile device with using a touch screen. Recently, the touch function is considered as an important function of the mobile device together with a user interface (UI). As the touch function is variously applied to the mobile device, required is developing a user interface (UI) corresponding to the touch function. Therefore, it is necessary to apply a method for sharing data using a touch screen in easy and intuitive manners to the mobile device.

SUMMARY OF THE INVENTION

Therefore, an aspect of the detailed description is to provide a method for determining a mobile terminal for data sharing in easy and intuitive manners.

Another aspect of the detailed description is to provide a method for sharing data between mobile terminals in easy and intuitive manners.

To achieve these and other advantages and in accordance with the purpose of this specification, as embodied and broadly described herein, there is provided a data transferring method for transferring data to a second mobile terminal by a first mobile terminal, the method including: displaying an object; receiving an input of a gesture performed toward a predetermined direction with respect to an object displayed on the first mobile terminal; and transmitting the object, based on the gesture, to a second mobile terminal positioned in a predetermined direction with respect to a direction of the first mobile terminal.

According to another aspect of the present invention, the method may further include acquiring direction information of the second mobile terminal, and determining a second mobile terminal to which data is to be transferred based on direction information of the first mobile terminal and the acquired direction information of the second mobile terminal.

According to another aspect of the present invention, the step of acquiring direction information of the second mobile terminal may include transmitting a direction information request message to the second mobile terminal, and receiving direction information from the second mobile terminal.

According to another aspect of the present invention, the step of determining a second mobile terminal may include determining the second mobile terminal as a mobile terminal to which data is to be transferred when a phase difference between the first mobile terminal and the second mobile terminal is within a predetermined range.

According to another aspect of the present invention, the step of determining a second mobile terminal may include outputting at least one of an image, sound, vibration and light if the second mobile terminal is determined as a mobile terminal to which data is to be transferred.

According to another aspect of the present invention, the step of receiving an input of a gesture may include receiving a touch on a predetermined point inside the object, and receiving an input of a drag touch toward the second mobile terminal from the touched point.

According to another aspect of the present invention, the step of receiving an input of a gesture may include receiving an input of a swipe event toward the second mobile terminal.

According to another aspect of the present invention, the step of transmitting the object may include transmitting the object to the second mobile terminal via a third mobile terminal when a phase difference between the first mobile terminal and the third mobile terminal is within a predetermined range.

According to another aspect of the present invention, the second mobile terminal may include a display unit configured to display direction information in colors or shapes.

According to another aspect of the present invention, the method may further include releasing a connected state between the first mobile terminal and the second mobile terminal.

According to another aspect of the present invention, the step of releasing may further include releasing a connected state between the first mobile terminal and the second mobile terminal when a phase difference between the first mobile terminal and the second mobile terminal is out of a predetermined range.

According to another aspect of the present invention, the method may further include stopping data transmission when a phase difference between the first mobile terminal and the second mobile terminal is out of a predetermined range, and resuming the data transmission when the phase difference between the first mobile terminal and the second mobile terminal is again within the predetermined range.

According to another aspect of the present invention, the step of transmitting the object may include displaying a message indicating that data is being received if the second mobile terminal is transmitting data, and transmitting the object after a predetermined time has lapsed.

To achieve these and other advantages and in accordance with the purpose of this specification, as embodied and broadly described herein, there is also provided a mobile device including a display unit configured to display an object, a user input unit configured to receive an input of a gesture performed toward a predetermined direction with respect to the object displayed on the first mobile terminal, and a controller configured to transmit the object, based on the gesture, to the second mobile terminal positioned in a predetermined direction with respect to a direction of the first mobile terminal.

The present invention may have the following advantages.

Firstly, a mobile terminal for data sharing may be determined in easy and intuitive manners.

Secondly, a method for sharing data between mobile terminals in easy and intuitive manners may be provided to a user.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

The suffixes attached to components, such as 'module' and 'unit or portion' were used for facilitation of the detailed description of the present disclosure. Therefore, the suffixes do not have different meanings from each other.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

For the sake of brief description with reference to the drawings, the same or equivalent components will be provided with the same reference numbers, and description thereof will not be repeated.

Figure 1:
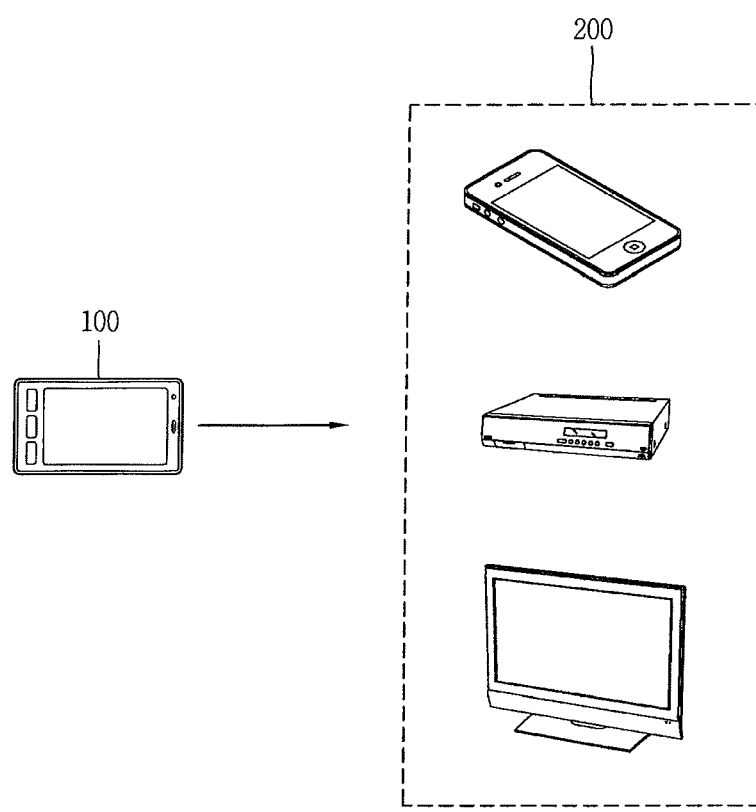
FIG. 1 is a view showing data transmission between mobile terminals.

FIG. 1 is a view showing data transmission between mobile terminals.

As shown in FIG. 1, a first mobile terminal 100 may transmit predetermined data to a second mobile terminal 200.

The first and second mobile terminals according to the present invention may include a mobile device, a fixed terminal, etc.

The mobile device may include a portable phone, a smart phone, a laptop computer, a digital broadcasting terminal, Personal Digital Assistants (PDA), Portable Multimedia Player (PMP), a navigation system, etc. And, the fixed terminal may include a digital TV, a desktop computer, etc.

The first mobile terminal is defined as a mobile terminal capable of transferring data to another mobile terminal (e.g., second mobile terminal), and the second mobile terminal is defined as a mobile terminal capable of receiving data from another mobile terminal (e.g., first mobile terminal).

The first and second mobile terminals may include a wireless communication unit, a short-range communication module, etc. for connection with another mobile terminal and for data transmission to another mobile terminal.

The wireless communication unit allows wireless communications between a mobile terminal and a wireless communication system, or between a mobile terminal and a network where the mobile terminal is located.

The short-range communication module refers to a module for short-range communication. As the short range communication technologies, Bluetooth, radio frequency identification (RFID), infrared data association (IrDA), ultra-wideband (UWB), ZigBee, etc. may be used.

Under these configurations, the first mobile terminal may be connected to the second mobile terminal, and may transmit data to the second mobile terminal.

When the mobile terminal attempts a connection to another mobile terminal, the mobile terminal may determine whether to connect or not based on direction information. Therefore, the mobile terminal may comprise a sensing unit for acquiring direction information. The sensing unit may detect a position, a direction, etc. of the mobile terminal.

The first mobile terminal may acquire direction information of the first and second mobile terminals.

Hereinafter, components of the mobile terminal according to a first embodiment of the present invention will be explained in more details.

Figure 2:
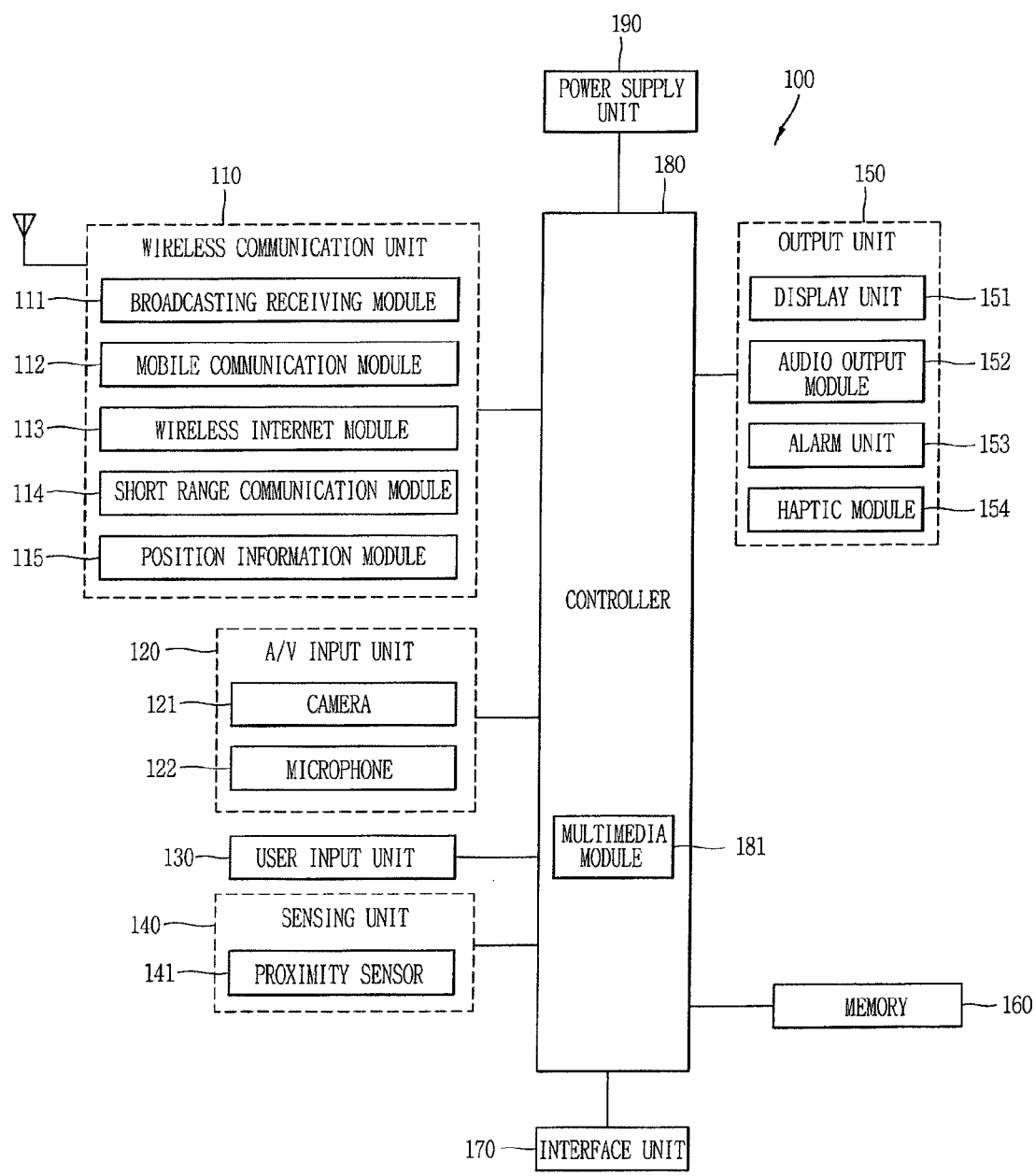
FIG. 2 is a block diagram showing a first mobile terminal according to a first embodiment of the present invention.

FIG. 2 is a block diagram showing a first mobile terminal according to a first embodiment of the present invention.

The first mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190 and the like. FIG. 2 shows the first mobile terminal 100 having various components, but it is understood that implementing all of the illustrated components is not a requirement. Greater or fewer components may alternatively be implemented.

The wireless communication unit 110 may typically include one or more modules which permit wireless communications between the first mobile terminal 100 and a wireless communication system or between the first mobile terminal 100 and a network within which a second mobile terminal 200 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing server via a broadcast channel.

The broadcast channel may include a satellite channel and a terrestrial channel. The broadcast managing server may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits and receives radio signals to and from at least one of a base station, an external terminal and a server. Such radio signals may include a voice call signal, a video call signal or various types of data according to text/multimedia message transmission and reception.

The mobile communication module 112 is configured to implement a video call mode and a voice call mode. The video call indicates a call performed with watching another party's image, and the voice call indicates a call performed without watching another party's image. For the video call mode and the voice call mode, the mobile communication module 112 is configured to transmit and receive at least one of a voice signal and a video signal.

The wireless Internet module 113 refers to a module for a wireless Internet access. This module may be internally or externally coupled to the first mobile terminal 100. The wireless Internet technique may include a WLAN (Wireless LAN) (Wi-Fi), Wibro (Wireless broadband), Wimax (World Interoperability for Microwave Access), HSDPA (High Speed Downlink Packet Access), etc.

The short-range communication module 114 refers to a module for short-range communication. As the short range communication technologies, Bluetooth, radio frequency identification (RFID), infrared data association (IrDA), ultra-wideband (UWB), ZigBee, etc. may be used.

The location information module 115 is a module for checking or acquiring a location (or position) of the portable terminal. A typical example of the location information module is a GPS (Global Positioning System).

Referring to FIG. 2, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory unit 160 or transmitted via the wireless communication unit 110. Two or more cameras 121 may be provided according to the configuration of the mobile terminal.

The microphone 122 may receive sounds (audible data) via a microphone or the like in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the portable terminal. The user input unit 130 allows the user to enter various types of information, and may include a keypad, a dome switch, a touch pad (e.g., static pressure/capacitance), a jog wheel, a jog switch, and the like.

The sensing unit 140 detects a current status (or state) of the first mobile terminal 100 such as an opened or closed state of the first mobile terminal 100, a location of the first mobile terminal 100, the presence or absence of user contact with the first mobile terminal 100, the orientation of the first mobile terminal 100, an acceleration or deceleration movement and direction of the first mobile terminal 100, etc., and generates commands or signals for controlling the operation of the first mobile terminal 100. For example, when the first mobile terminal 100 is implemented as a slide type mobile phone, the sensing unit 140 may sense whether the slide phone is opened or closed. When mobile terminals perform a connection based on direction information, the sensing unit 140 may sense direction information of the first mobile terminal 100 to use the direction information, or may sense direction information of the first mobile terminal 100 to transmit the direction information to another mobile terminal. In addition, the sensing unit 140 can detect whether or not the power supply unit 190 supplies power or whether or not the interface unit 170 is coupled with an external device. Meanwhile, the sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the first mobile terminal 100. For example, when the first mobile terminal 100 is in a phone call mode, the display unit 151 may display a User Interface (UI) or a Graphic User Interface (GUI) associated with a call. When the first mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the first mobile terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 2, a proximity sensor 141 may be arranged at an inner region of the first mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Accordingly, if the pointer is in proximity to the touch screen without contacting the touch screen, the position of the pointer and a distance between the pointer and the touch screen may be detected. Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces in a direction perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the first mobile terminal 100, e.g., sound alarming a call received or a message received, and so on. The audio output module 152 may include a receiver, a speaker, a buzzer, and so on.

The alarm 153 outputs signals notifying occurrence of events from the first mobile terminal 100. The events occurring from the first mobile terminal 100 may include call received, message received, key signal input, touch input, connection with another mobile terminal, and so on. The alarm 153 may output not only video or audio signals, but also other types of signals such as signals notifying occurrence of events in a vibration manner. Since the video signal or audio signal may be outputted through the display unit 151 or the audio output module 152, the display unit 151 and the audio output module 152 may be categorized as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the first mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the first mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the first mobile terminal 100, or a data transmission from the first mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the first mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the first mobile terminal 100 via a port.

Also, the interface unit 170 may serve as a path for power to be supplied from an external cradle to the first mobile terminal 100 when the first mobile terminal 100 is connected to the external cradle or as a path for transferring various command signals inputted from the cradle by a user to the first mobile terminal 100. Such various command signals or power inputted from the cradle may operate as signals for recognizing that the first mobile terminal 100 has accurately been mounted to the cradle.

The controller 180 typically controls the overall operations of the first mobile terminal 100. For example, the controller 180 performs the control and processing associated with telephony calls, data communications, video calls, and the like. And, the controller 180 may determined whether to access another mobile terminal or not based on direction information of the first mobile terminal 100 or acquired direction information of another mobile terminal. The controller may generate an operation command in correspondence to a user's touch input. The controller 180 may control data transmission to another mobile terminal connected thereto based on a user's touch input. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image. The power supply unit 190 serves to supply power to each component by receiving external power or internal power under control of the controller 180.

The controller 180 may detect data corresponding to an object selected, by a user, from one or more objects displayed on the display unit 151.

And, the controller 180 may detect a signal inputted to the object selected by the user.

Here, the object to which the user's intention or gesture is reflected may include an image, a moving image, an icon, a sound, a data file, an e-mail, SNS contents, a memo, contents of incoming/outgoing calls or instant messages, etc. Various types of objects rather than these types may exist.

Hereinafter, with reference to FIG. 3, will be explained a preferred embodiment for transferring data to a second mobile terminal by a first mobile terminal.

Figure 3:
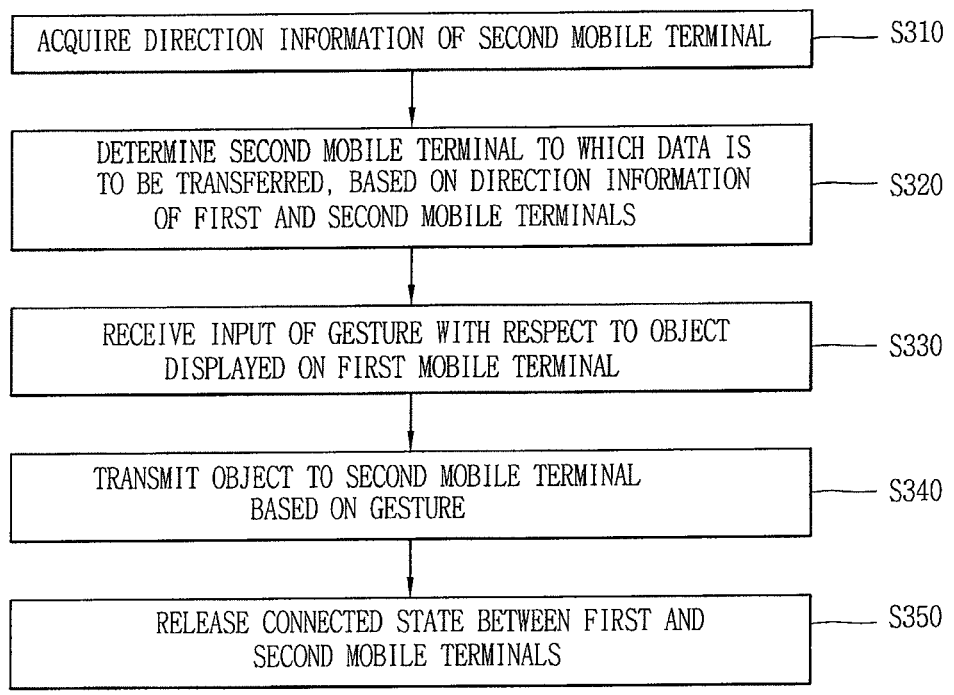
FIG. 3 is a flowchart of a first embodiment of the present invention.

FIG. 3 is a view showing a first embodiment of the present invention. Referring to FIG. 3, data is transferred to a second mobile terminal from a first mobile terminal.

As shown in FIG. 3, in the present invention according to one embodiment, the first mobile terminal may acquire direction information of the second mobile terminal (S310). The direction information may include a position of the mobile terminal, and a direction indicated by an upper end of the mobile terminal, etc.

Figure 4:
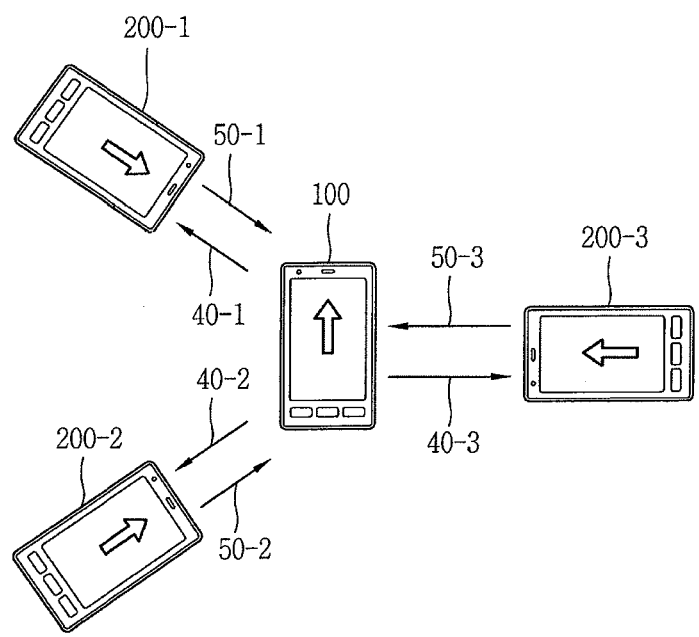
FIG. 4 is a view showing an example of one process of FIG. 3.

FIG. 4 is a view showing a method for acquiring direction information according to one embodiment of the present invention. Referring to FIG. 4, the first mobile terminal 100 can transmit direction information request messages 40-1, 40-2 and 40-3 to second mobile terminals 200-1, 200-2 and 200-3 that are near or positioned to be close to the first mobile terminal 100.

The direction information request messages await response messages from the second mobile terminals. The direction information request messages request the response messages of the second mobile terminals to include direction information of the second mobile terminals. In addition, the direction information request message may be transmitted through a user datagram protocol (UDP).

Then, the second mobile terminals 200-1, 200-2 and 200-3 having received the direction information request messages from the first mobile terminal 100 transmit response messages 50-1, 50-2 and 50-3 to the first mobile terminal 100. The response messages 50-1, 50-2 and 50-3 include direction information of the second mobile terminals. Under these configurations, the first mobile terminal 100 can acquire direction information of the second mobile terminals 200-1, 200-2 and 200-3.

Thus, in the present invention according to one embodiment, a second mobile terminal to which data is to be transferred may be determined based on direction information of the first mobile terminal, and acquired direction information of the second mobile terminal (S320).

FIG. 5 is a view showing a method for determining a second mobile terminal to which data is to be transferred. Further, a direction indicated by an upper end of the mobile terminal is expressed using coordinates.

Figure 5A:
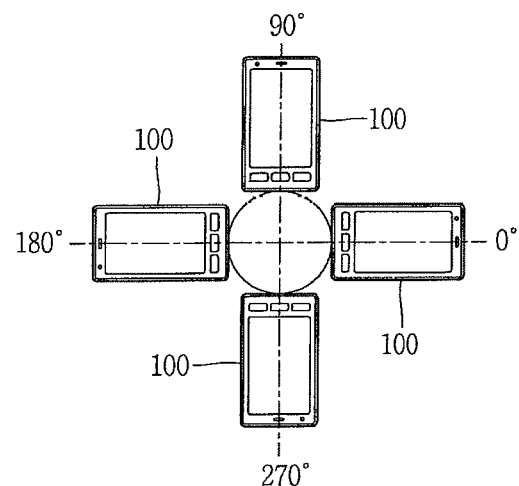
FIG. 5 is a view showing an example of one process of FIG. 3.

As shown in FIG. 5A, when the upper end of the first mobile terminal 100 is toward or facing the right side, an angle of the first mobile terminal 100 is defined as 0°; and when the upper end of the first mobile terminal 100 is toward or facing the upper side, an angle of the first mobile terminal 100 is defined as 90°. In addition, when the upper end of the first mobile terminal 100 is toward the left side, an angle of the first mobile terminal 100 is defined as 180'; and when the upper end of the first mobile terminal 100 is toward the lower side, an angle of the first mobile terminal 100 is defined as 270°. In this manner, directions of the upper end of the first mobile terminal 100 may be expressed as angles.

Further, the first mobile terminal 100 may acquire information on a position and a direction thereof by the sensing unit 140. Through the aforementioned step (S310) of acquiring direction information of the second mobile terminal 200, the first mobile terminal 100 can acquire information on a position and a direction of the second mobile terminal 200.

When a phase difference between a direction of the first mobile terminal 100 and a direction of the second mobile terminal 200 is within a predetermined range, the first mobile terminal 100 may determined the second mobile terminal 200 as a mobile terminal to which an object is to be transferred.

Figure 5B:
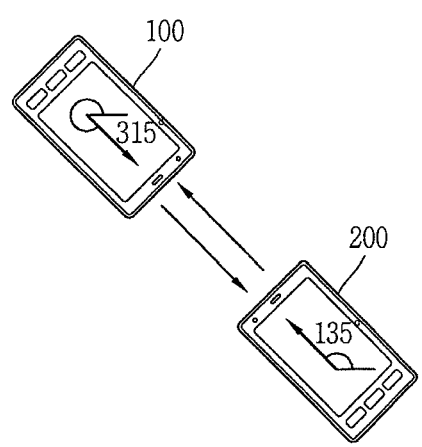

For instance, as shown in FIG. 5B, when a phase difference between the first mobile terminal 100 and the second mobile terminal 200 is 180°, the first mobile terminal 100 may determine the second mobile terminal 200 as the mobile terminal to which an object is to be transferred.

Also, as shown in FIG. 5B, the upper end of the first mobile terminal 100 indicates 315° on a coordinate axis, and the upper end of the second mobile terminal 200 indicates 135° on a coordinate axis. Accordingly, a phase difference between the first mobile terminal 100 and the second mobile terminal 200 is 180°, and the first mobile terminal 100 may determine the second mobile terminal 200 as the mobile terminal to which an object is to be transferred.

Figure 5C:
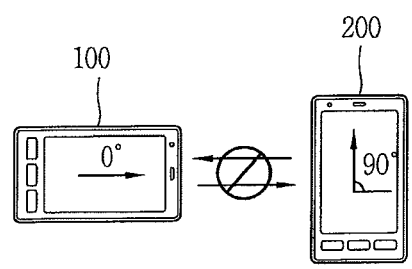
Figure 5D:
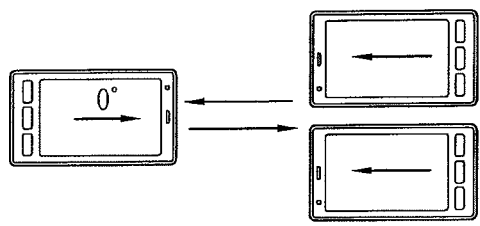

Referring to FIG. 5C, the upper end of the first mobile terminal 100 indicates 0° on a coordinate axis, and the upper end of the second mobile terminal 200 indicates 90° on a coordinate axis. Accordingly, a phase difference between the first mobile terminal 100 and the second mobile terminal 200 is 90°, and the first mobile terminal 100 may determine the second mobile terminal 200 is not the mobile terminal to which an object is to be transferred.

In the aforementioned embodiment, the phase difference for determining the second mobile terminal 200 as the mobile terminal to which an object is to be transferred by the first mobile terminal is 180°. However, the range of the phase difference may be variable. For instance, the phase difference for determining the second mobile terminal 200 as the mobile terminal to which an object is to be transferred by the first mobile terminal may be set within the range of 175°~185°, 170°~190°, etc. The phase difference range may also be variably set by the user.

When a phase difference between directions of the upper ends of the first and second mobile terminals 100 and 200 is about 180°, the two mobile terminals 100 and 200 are disposed toward or facing the opposite directions. Therefore, when the two mobile terminals are arranged with a phase difference of about 180°, a user may intuitively predict that one mobile terminal is configured to transmit data and another mobile terminal is configured to receive data. This allows a communication channel to be easily formed between the two mobile terminals.

Once the second mobile terminal 200 to which data is to be transferred has been determined, the alarm unit 153 and the output unit 150 of the first and second mobile terminals 100 and 200 can output the information in the form of images, sound, vibration, light, etc. This enhances a user's recognition.

If the second mobile terminal 200 which is disposed within a predetermined range with respect to a direction of the first mobile terminal includes multiple second terminals, the data can be transferred to the multiple second terminals.

FIG. 6 is a view showing a preferred embodiment where the second mobile terminal 200 is implemented as a fixed terminal. Further, a user can easily recognize upper and lower ends of the mobile device. Therefore, a direction of the mobile device can be intuitively recognized. However, it may be difficult to recognize a direction of the fixed terminal.

That is, the user may have to manually input this direction information of the fixed terminal. For example, a user may input direction information of the fixed terminal through the user input unit 130, etc. The direction information can then be stored in the memory 160. Alternatively, the direction information may be automatically sensed by the fixed terminal (and the user can modify if necessary when installing the fixed terminal).

Figure 6A:
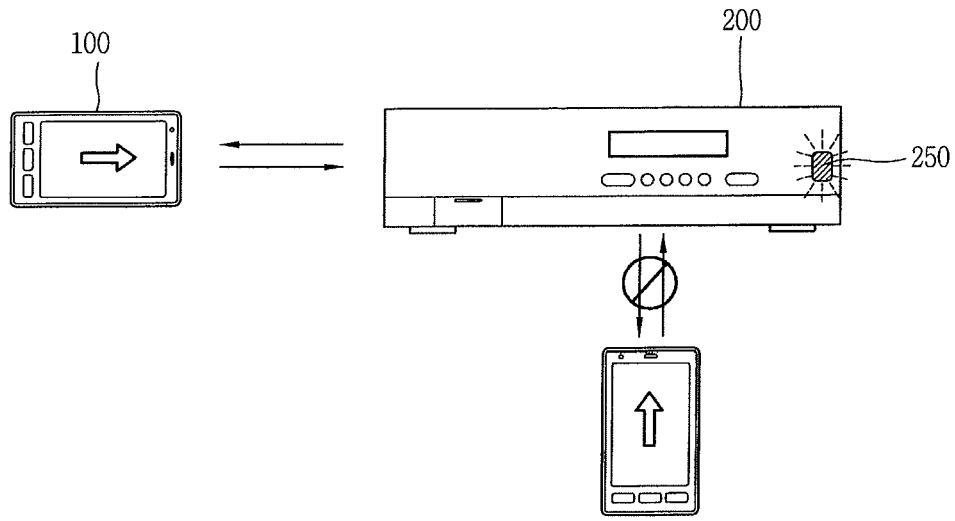
FIG. 6 is a view showing an example of one process of FIG. 3.
Figure 6B:
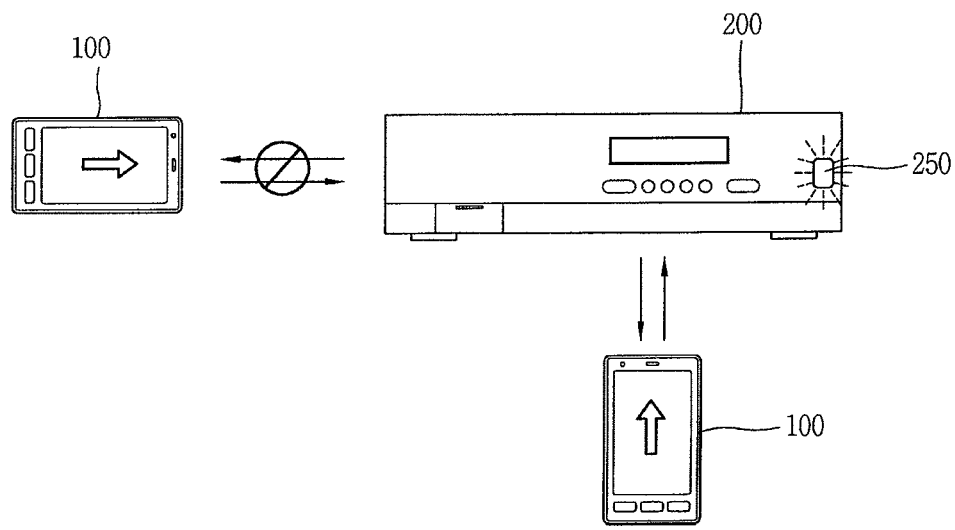
Figure 6C:
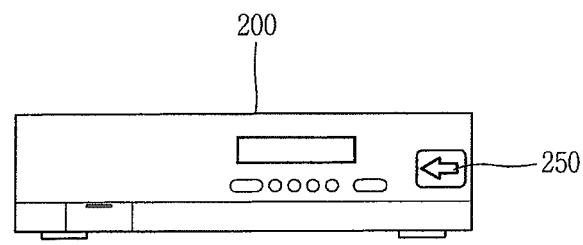

Referring to FIG. 6A-6C, the fixed terminal 200 can display direction information via an output unit 250, etc. For instance, directions of the fixed terminal, e.g., upper, lower, right and left sides may be indicated by a four-color LED. More concretely, a red color may be displayed when the direction of the fixed terminal is the left side, a green color may be displayed when the direction of the fixed terminal is the right side, a blue color may be displayed when the direction of the fixed terminal is the upper side, and a white color may be displayed when the direction of the fixed terminal is the lower side. Here, the colors indicating the directions of the fixed terminal may be set in a various manner.

Referring to FIG. 6A, since a red color is displayed on the output unit 250 of the second mobile terminal 200 (the fixed terminal), the direction of the second mobile terminal 200 is the left side. Therefore, when the first mobile terminal 100 is positioned at the left side of the second mobile terminal 200, the first mobile terminal 100 can transmit data to the second mobile terminal 200. However, when the first mobile terminal 100 is positioned below the second mobile terminal 200, the first mobile terminal 100 cannot transmit data to the second mobile terminal 200.

Referring to FIG. 6B, since a white color is displayed on the output unit 250 of the second mobile terminal 200 (the fixed terminal), the direction of the second mobile terminal 200 is the lower side. Therefore, when the first mobile terminal 100 is positioned at the left side of the second mobile terminal 200, the first mobile terminal 100 cannot transmit data to the second mobile terminal 200. However, when the first mobile terminal 100 is positioned below the second mobile terminal 200, the first mobile terminal 100 can transmit data to the second mobile terminal 200.

Instead of indicating direction information of the fixed terminal in colors, the direction information of the fixed terminal may be directly displayed to the output unit 250. For example, referring to FIG. 6C, if the direction of the fixed terminal is set as the left side, an arrow toward the left side can be displayed via the output unit 250.

In this manner, a user may correct direction information of the fixed terminal. This allows the user to intuitively recognize direction information of the fixed terminal. The first terminal 100 can also be facing a front of the second terminal. For example, the user can point their cell phone 100 towards a front face of a set top box or TV (second terminal) for example.

Referring again to FIG. 3, a user inputs a gesture with respect to an object displayed on the display unit 151 of the first mobile terminal 100 (S330). The first mobile terminal 100 then transmits the object to the second mobile terminal 200 based on the gesture (S340). Here, the gesture indicates that predetermined data of the first mobile terminal should be transmitted to the second mobile terminal. The object may also include a file, a still image, a moving image, an icon, a sound, an e-mail, etc.

Figure 7:
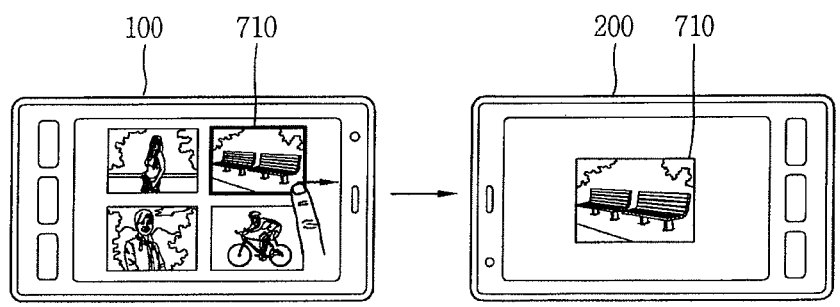
FIG. 7 is a view showing an example of implementation of a method of FIG. 3.

Next, FIG. 7 is a view showing a method for transmitting an object input to an object 710 displayed on the display unit 151 of the first mobile terminal 100 to the second mobile terminal 200 through a predetermined gesture.

As shown in FIG. 7, the object 710 to be transferred to the second mobile terminal 200 can be selected by a user from a plurality of objects displayed on the display unit 151 of the first mobile terminal 100. The controller 180 of the first mobile terminal 100 then recognizes the object 710 selected by the user by receiving a touch input performed on a predetermined point on the object 710.

The first mobile terminal 100 can also receive a touch input with respect to a predetermined point inside the object, and receive a drag touch input toward the determined second terminal 200 from the touched point. Thus, the controller 180 can recognize the input as a command to transmit data with respect to the selected object to the second mobile terminal 200.

Further, when receiving a swipe event toward the second mobile terminal 200 with respect to the object 710 displayed on the display unit 151 of the first mobile terminal 100, the first mobile terminal 100 can transmit data with respect to the object 710 to the second mobile terminal 200. The swipe event is a gesture of the user moving one finger horizontally or vertically by a predetermined distance on the screen.

Referring to FIG. 7, one object 710 is selected from a plurality of objects displayed on the display unit 151 of the first mobile terminal 100, and a gesture toward the second mobile terminal 200 is input. As a result, the object (picture file) 710 is transmitted to the second mobile terminal 200.

Therefore, through a motion to move a selected object for transmission toward the second mobile terminal 200, the selected object can be transmitted to the second mobile terminal 200 from the first mobile terminal 100. This allows a transmission command to be input in an intuitive manner, and a user can conveniently use the function.

Once data has been transmitted to the second mobile terminal 200 from the first mobile terminal 100, the first mobile terminal 100 may store transmission records in the memory 160. The transmission history may include data transmitted from the first mobile terminal 100, and information on the second mobile terminal 200 having received data from the first mobile terminal 100. As the transmission records are stored, the reliability of the transmission is enhanced.

Further, duplication of data with respect to the selected object may be limited by a digital rights management (DRM), etc. In this instance, the first mobile terminal 100 may transmit data only to a buffer of the second mobile terminal 200, so that the data is not stored in the second mobile terminal 200 and the second mobile terminal 200 can only perform only real-time streaming.

Also when the first mobile terminal 100 has received a command to transmit data to the second mobile terminal 200, the second mobile terminal 200 may not receive data or the first mobile terminal 100 may not transmit data. For instance, in a situation that the first mobile terminal 100 has to transmit data to the second mobile terminal 200, communication resources may be deficient since the first mobile terminal 100 is receiving data from the second mobile terminal 200.

In this instance, the first mobile terminal 100 may display, on the display unit 150, a message indicating that data cannot be transmitted to the second mobile terminal 200. Alternatively, data transmission to the second mobile terminal 200 may be attempted again after a predetermine time has lapsed. For instance, if the first mobile terminal 100 is receiving data from the second mobile terminal 200, the first mobile terminal 100 may display a message indicating that data is being received, and may transmit data to the second mobile terminal 200 after a predetermined time has lapsed.

Figure 8:
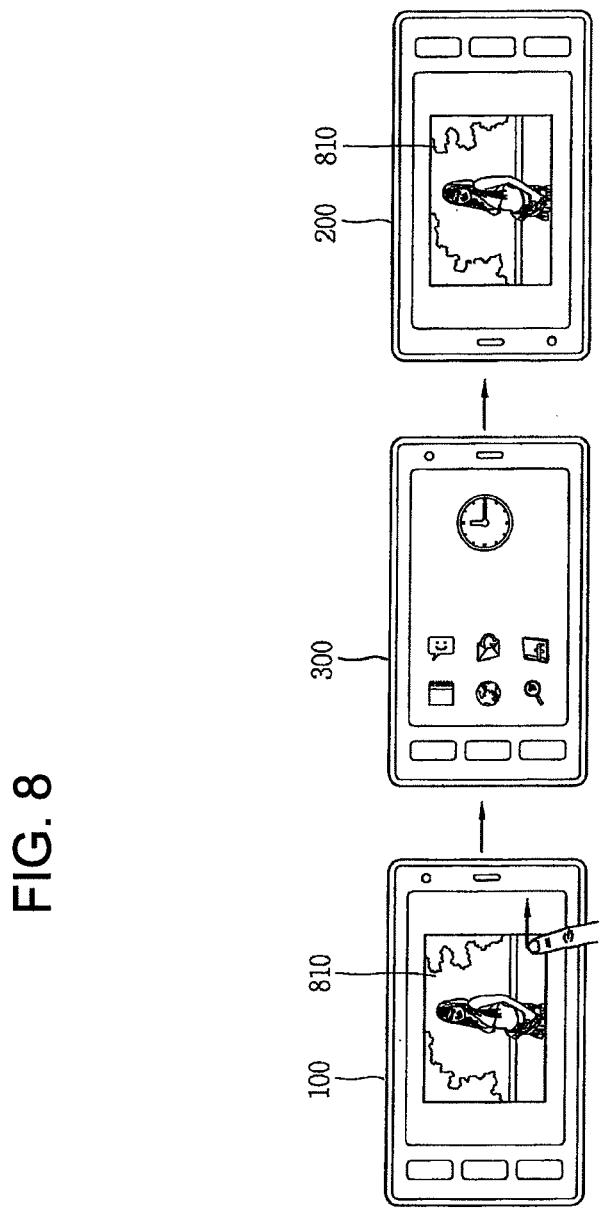
FIG. 8 is a view showing a modification example of implementation of the method of FIG. 3.

Next, FIG. 8 is a view showing a method for transmitting data to the second mobile terminal from the first mobile terminal 100 via a third mobile terminal 300. The third mobile terminal 300 is defined as a mobile terminal for receiving data from the first mobile terminal 100 and transmitting the received data to the second mobile terminal 200.

When each phase difference between the third mobile terminal 300 and the first mobile terminal 100 and between the third mobile terminal 300 and the second mobile terminal 200 is within a predetermined range, the third mobile terminal 300 can receive data from the first mobile terminal 100 and transmit the received data to the second mobile terminal 200.

For instance, when the third mobile terminal 300 has a phase difference of 0° from the first mobile terminal 100 and has a phase difference of 180° from the second mobile terminal 200, the third mobile terminal 300 may perform a function thereof.

Referring to FIG. 8, the third mobile terminal 300 has a phase difference of 0° from the first mobile terminal 100 and has a phase difference of 180° from the second mobile terminal 200. Accordingly, the third mobile terminal 300 can transmit to the second mobile terminal 200 data with respect to an object 810 transmitted from the first mobile terminal 100.

In the aforementioned embodiment, the third mobile terminal 300 has a phase difference of 0° from the first mobile terminal 100 and has a phase difference of 180° from the second mobile terminal 200 so as to perform a forward function. However, the range of the phase difference may change in various manners. For instance, even when the third mobile terminal 300 has a phase difference of 0°~5° from the first mobile terminal 100 and has a phase difference of 175°~185° from the second mobile terminal 200, the third mobile terminal 300 may perform a forward function.

Figure 9:
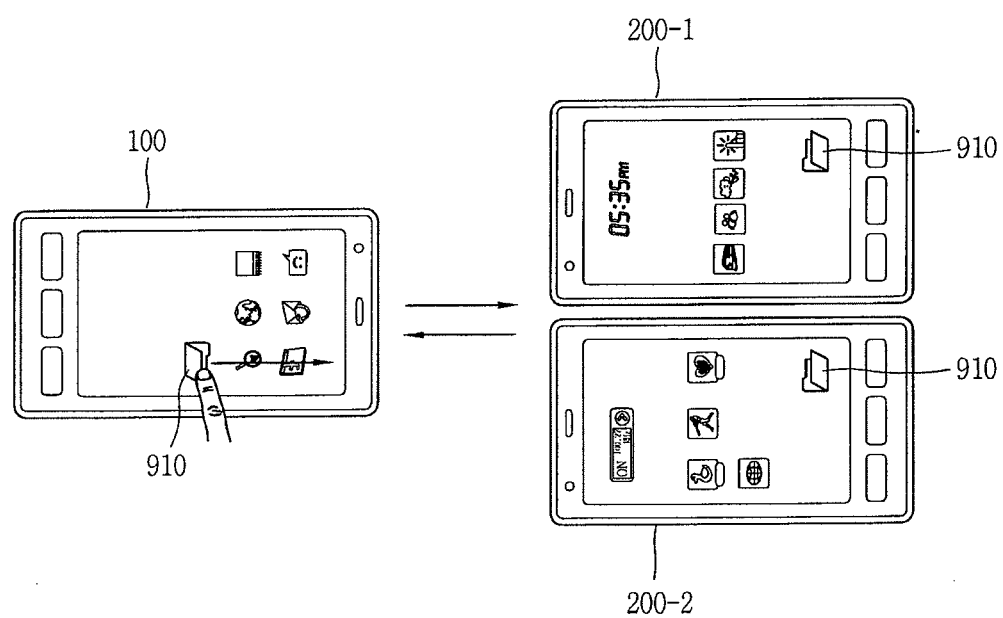
FIG. 9 is a view showing a modification example of implementation of the method of FIG. 3.

Next, FIG. 9 is a view showing a method for transmitting data of the first mobile terminal to a plurality of the second mobile terminals connected to the first mobile terminal. As shown in FIG. 9, the first mobile terminal 100 may be connected to a plurality of second mobile terminals 200-1 and 200-2. In this instance, a phase difference between the second mobile terminals 200 and the first mobile terminal 100 has to be within the aforementioned predetermined range.

When a plurality of the second mobile terminals 200-1 and 200-2 are connected to the first mobile terminal 100, data 910 of the first mobile terminal 100 can be transmitted to a plurality of the second mobile terminals 200-1 and 200-2. Here, the data may be transmitted to the second mobile terminals 200 from the first mobile terminal 100 in the same manner as the aforementioned manner.

Further, a plurality of the second mobile terminals 200-1 and 200-2 can receive data from the first mobile terminal 100, sequentially. Here, the order that the second mobile terminals 200 receive data from the first mobile terminal 100 may be set at random. Alternatively, the order may be set based on a response order with respect to the direction information request messages.

When the first mobile terminal 100 transmits data to the second mobile terminals 200-1 and 200-2, the first mobile terminal 100 can display, on the output unit 150 thereof, the second terminals 200 which are receiving the data from the first mobile terminal 100 for a user's convenience.

Then as shown in FIG. 3, the first mobile terminal may release a connected state to the second mobile terminal (S350). The release may occur when a phase difference between the first mobile terminal 100 and the second mobile terminals 200 is out of the aforementioned predetermined range. Alternatively, a user may input a command to release a connected state between the first mobile terminal 100 and the second mobile terminal(s) 200 through the user input unit 130.

While data is being transmitted to the second mobile terminal(s) 200 from the first mobile terminal 100, the data transmission may be cancelled. The cancelation of the data transmission may occur when a phase difference between the first mobile terminal 100 and the second mobile terminal(s) 200 is out of the aforementioned predetermined range. Alternatively, a user may input a command to release a connected state between the first mobile terminal 100 and the second mobile terminals) 200 through the user input unit 130.

If a phase difference between the first mobile terminal 100 and the second mobile terminal(s) 200 is out of the predetermined range while data is transmitted to the second mobile terminal(s) 200 from the first mobile terminal 100, the data transmission may be cancelled. However, if the phase difference is again within the predetermined range, the first mobile terminal 100 may resume the data transmission to the second mobile terminal(s) 200.

Figure 10:
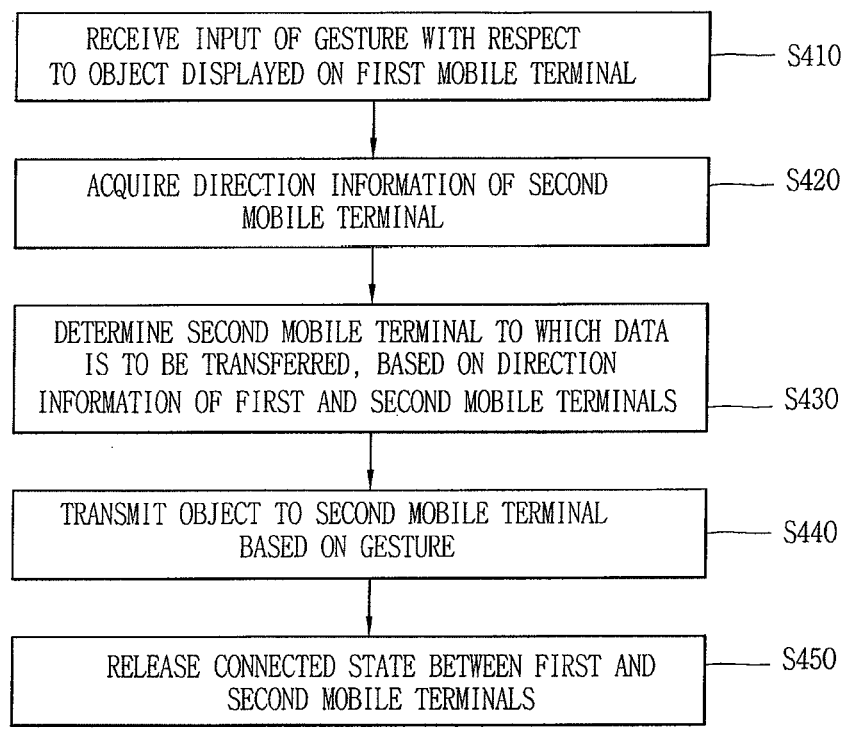
FIG. 10 is a flowchart of a second embodiment of the present invention.

FIG. 10 is a view showing a second embodiment of the present invention. In the first embodiment, the step of acquiring direction information of the second mobile terminal 200 (S310) and the step of determining the second mobile terminal 200 as a mobile terminal to which data is to be transferred (S320) are performed before the step of inputting a gesture with respect to an object (S330).

However, in the second embodiment of FIG. 10, the step of acquiring direction information of the second mobile terminal 200 (S420) and the step of determining the second mobile terminal 200 as a mobile terminal to which data is to be transferred (S430) is performed after the step of inputting a gesture with respect to an object (S410). More concretely, after a gesture with respect to an object displayed on the first mobile terminal 100 has been input, the first mobile terminal 100 acquires direction information of the second mobile terminal 200.

In the first embodiment shown in FIG. 5, when a phase difference between the first mobile terminal 100 and the second mobile terminal 200 is within a predetermined range, the second mobile terminal 200 is determined as a mobile terminal to which data is to be transferred.

In a different manner, a mobile terminal corresponding to a direction of a gesture with respect to an object may be determined as a mobile terminal to which data is to be transferred, without considering a direction of the second mobile terminal 200.

In addition, the first mobile terminal 100 may be a user's cell phone, smart phone, etc. and the second terminal 200 may be a TV, set top box, personal computer, laptop, camera, etc. Thus, the user could have pictures taken and/or stored on their cell phone transferred and displayed by the TV simply by pointing their cell phone to the TV and performing a touching gesture toward the TV. An entire folder of pictures may also be transferred by performing the touch gesture on the folder. A similar situation applies to the user's camera being the first mobile terminal and the TV being the second terminal.

The aforementioned embodiments may be used separately or in a combined manner with each other. The steps of one embodiment may be used separately or in a combined manner with the steps of another embodiment.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof.

For a software implementation, the embodiments such as procedures and functions may be implemented together with separate software modules each of which performs at least one of functions and operations. The software codes can be implemented with a software application written in any suitable programming language. Also, the software codes may be stored in the memory and executed by a processor.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of transferring data between a first mobile terminal and a second terminal, the method comprising:
   displaying an object on a display unit of the first mobile terminal;
   receiving an input of a gesture toward one end of the first mobile terminal with respect to the object;
   transmitting a request message to the second mobile terminal in response to the gesture;

receiving direction information from the second terminal, wherein the direction information sensed by a sensing unit of the second terminal indicates a direction toward which one end of the second terminal faces;

determining, based on the received direction information, whether or not a phase difference between a first direction toward which the one end of the first mobile terminal is facing and the direction toward which one end of the second terminal faces is within a predetermined range of plus or minus 45 degrees with respect to the phase difference of 180 degrees;

acquiring direction information of the second terminal in response to the gesture;

transmitting the object to the second terminal when the phase difference is within the predetermined range; and stopping data transmission of the object based on the direction information when the direction is changed and the phase difference is outside of the predetermined range.

2. The method of claim 1, wherein the second terminal is a mobile terminal or a fixed terminal.

3. The method of claim 1, further comprising:
outputting at least one of an image, sound, vibration and light when the calculated phase difference is within the predetermined range.

4. The method of claim 1, wherein the input of the gesture includes one of a touch action on a predetermined point inside the object, a touch and drag action touch on the object toward the second mobile terminal, and a swiping touch action on the object toward the second terminal.

5. The method of claim 1, wherein the transmitting the object comprises:
transmitting the object to the second terminal via a third mobile terminal when the first mobile terminal and the third mobile terminal are in the predetermined range with respect to each other.

6. The method of claim 1, further comprising:
releasing a connected state between the first mobile terminal and the second terminal when the first mobile terminal and the second terminal are no longer in the predetermined range;
stopping the transmission of the object to the second terminal, when the first mobile terminal and the second terminal are no longer in the predetermined range; and
resuming the transmission of the object to the second terminal when the first mobile terminal and the second terminal are back within the predetermined range.

7. The method of claim 1, further comprising:
determining if the second terminal is in the direction of the input gesture; and
determining if the first mobile terminal and the second terminal are in the predetermined range only if the second terminal is in the direction of the input gesture.

8. The method of claim 1, wherein the gesture is received before the direction information is acquired or the gesture is received after the direction information is acquired.

9. A first mobile terminal, comprising:
a display unit configured to display an object;
a wireless communication unit; and
a controller configured to:
receive an input of a gesture toward one end of the first mobile terminal with respect to the object,
control the wireless communication unit to transmit a request message to the second mobile terminal in response to the gesture;
receive direction information from the second terminal, wherein the direction information sensed by a sensing unit of the second terminal indicates a direction toward which one end of the second terminal faces,
determine, based on the received direction information, whether or not a phase difference between a first direction toward which the one end of the first mobile terminal is facing and the direction toward which one end of the second terminal faces is within a predetermined range of plus or minus 45 degrees with respect to the phase difference of 180 degrees;
control the wireless communication unit to transmit the object to the second terminal when the phase difference is within the predetermined range, and
stop data transmission of the object based on the direction information when the direction toward is changed and the phase difference is outside of the predetermined range.

10. The mobile terminal of claim 9, wherein the second terminal is a mobile terminal or a fixed terminal.

11. The mobile terminal of claim 9, wherein the controller is further configured to output at least one of an image, sound, vibration and light when the calculated phase difference is within the predetermined range.

12. The mobile terminal of claim 9, wherein the input of the gesture includes one of a touch action on a predetermined point inside the object, a touch and drag action touch on the object toward the second terminal, and a swiping touch action on the object toward the second terminal.

13. The mobile terminal of claim 9, wherein the controller is further configured to transmit the object to the second terminal via a third mobile terminal when the first mobile terminal and the third mobile terminal are in the predetermined range with respect to each other.

14. The mobile terminal of claim 9, wherein the controller is further configured to release a connected state between the first mobile terminal and the second terminal when the first mobile terminal and the second terminal are no longer in the predetermined range, to stop the transmission of the object to the second terminal, when the first mobile terminal and the second terminal are no longer in the predetermined range, and to resume the transmission of the object to the second terminal when the first mobile terminal and the second terminal are back within the predetermined range.

15. The mobile terminal of claim 9, wherein the controller is further configured to determine if the second terminal is in the direction of the input gesture, and to determine if the first mobile terminal and the second terminal are in the predetermined range only if the second terminal is in the direction of the input gesture.

16. The mobile terminal of claim 9, wherein the gesture is received before the direction information is acquired or the gesture is received after the direction information is acquired.

17. The method of claim 1, wherein the predetermined range for the phase difference is 170 degrees to 190 degrees.

18. The mobile terminal of claim 9, wherein the predetermined range for the phase difference is 170 degrees to 190 degrees.

* * * * *